United States Patent
Lin et al.

(10) Patent No.: US 7,483,249 B2
(45) Date of Patent: Jan. 27, 2009

(54) OVERVOLTAGE PROTECTIVE DEVICE FOR DC MOTOR

(75) Inventors: Lain-ken Lin, Changhua County (TW); Magellan Chiu, Taichung (TW); Venson Kuo, Kaohsiung County (TW); Wen-shi Huang, Taoyuan (TW)

(73) Assignee: Delta Electronics, Inc. (TW)

( * ) Notice: Subject to any disclaimer, the term of this patent is extended or adjusted under 35 U.S.C. 154(b) by 216 days.

(21) Appl. No.: 10/698,893

(22) Filed: Oct. 31, 2003

(65) Prior Publication Data

US 2004/0264086 A1 Dec. 30, 2004

(30) Foreign Application Priority Data

Jun. 26, 2003 (TW) ............... 92211684 U

(51) Int. Cl.
*H02H 9/04* (2006.01)

(52) U.S. Cl. .................. 361/91.1
(58) Field of Classification Search ............ 361/91.1; 318/254
See application file for complete search history.

(56) References Cited

U.S. PATENT DOCUMENTS

| | | | | |
|---|---|---|---|---|
| 4,914,540 A | * | 4/1990 | Tabata et al. ........... | 361/91.7 |
| 5,076,761 A | * | 12/1991 | Krohn et al. ........... | 417/18 |
| 5,087,865 A | * | 2/1992 | Nelson, III ........... | 318/139 |
| 5,513,058 A | * | 4/1996 | Hollenbeck ........... | 361/36 |
| 5,811,948 A | * | 9/1998 | Sato et al. ........... | 318/434 |
| 6,396,225 B1 | * | 5/2002 | Wakui et al. ........... | 318/254 |
| 6,879,120 B2 | * | 4/2005 | Xi ........... | 318/254 |

FOREIGN PATENT DOCUMENTS

| | | |
|---|---|---|
| JP | 11-004593 | 1/1999 |
| JP | 11-046490 | 2/1999 |
| JP | 2001-025288 | 1/2001 |
| JP | 2002-058273 | 2/2002 |
| TW | 499109 | 8/2002 |
| TW | 536064 | 6/2003 |
| TW | 540902 | 7/2003 |

* cited by examiner

*Primary Examiner*—Michael J Sherry
*Assistant Examiner*—Lucy Thomas
(74) *Attorney, Agent, or Firm*—Martine Penilla & Gencarella, LLP

(57) ABSTRACT

An overvoltage protective device for DC motor is disclosed. The device includes a voltage-dividing circuit and a control unit, and is electrically connected to a DC motor in parallel. The voltage-dividing circuit has one end thereof electrically connected to an input voltage of the DC motor, and the other end thereof grounded. The control unit is electrically connected to a part of the voltage-dividing circuit for accessing a voltage level thereof and thereby driving the DC motor.

17 Claims, 2 Drawing Sheets

OVERVOLTAGE PROTECTIVE DEVICE FOR DC MOTOR

BACKGROUND OF THE INVENTION (a) Field of the Invention

The invention relates to an over-voltage protective device, and more particularly, to an over-voltage protective device for direct-current motor.

(b) Description of the Related Art

Direct-current (DC) motors are one of the most commonly applied motors in industrial use. Generally, the amount of current per unit time is raised to enhance rotational speed of DC motor for achieving expected operation efficiency. However, since DC motors are considered as one kind of inductive loads, the input voltages of DC motors are likely to be excessive as the amount of current per unit time is raised, and DC motor coils are prone to be damaged.

SUMMARY OF THE INVENTION

To overcome the problems of damaging the coils by excessive current of prior DC motors, the invention provides an overvoltage protective device electrically connected to a DC motor to avoid excessive operating voltages of the DC motor.

The object the invention is to provide an overvoltage protective device of DC motor, wherein the overvoltage protective device accesses a part of an input voltage of a DC motor for determining whether the part of the input voltage exceeds a default value. If yes, the overvoltage protective device outputs an overvoltage interrupt signal to stop operations of the DC motor.

An overvoltage protective device of DC motor according to an embodiment of the invention is in parallel connection with a DC motor, and includes a voltage-dividing circuit and a control unit. The voltage-dividing circuit has one end thereof electrically connected to an input voltage of the DC motor, and the other end thereof connected to ground. The micro controller is in parallel connection with a part of the voltage-dividing circuit to access a voltage level of the part and to control start of the DC motor.

An overvoltage protective device of DC motor according to another embodiment of the invention includes a first voltage-dividing circuit with one end thereof electrically connected to an input voltage of a DC motor, and the other end thereof connected to ground; a second voltage-dividing circuit with one end thereof electrically connected to a reference voltage, and the other end thereof connected to ground; a control unit for controlling operations of the DC motor; and an operation amplifier having a non-inverted input end thereof electrically connected to the first voltage-dividing circuit, an inverted input end thereof electrically connected to the second voltage-dividing circuit, and an output end thereof electrically connected to the micro controller. When the input voltage of the DC motor is larger than a rated voltage of the DC motor, the operation amplifier outputs an overvoltage interrupt signal to the micro controller, and the micro controller then stops controlling the start of the DC motor.

The invention is excellent for that the DC motor is prevented from damages caused by overvoltage, and the DC motor is ensured to operate only when the input voltage does not go beyond a nominal value.

DETAILED DESCRIPTION OF THE PREFERRED EMBODIMENTS

Figure 1:
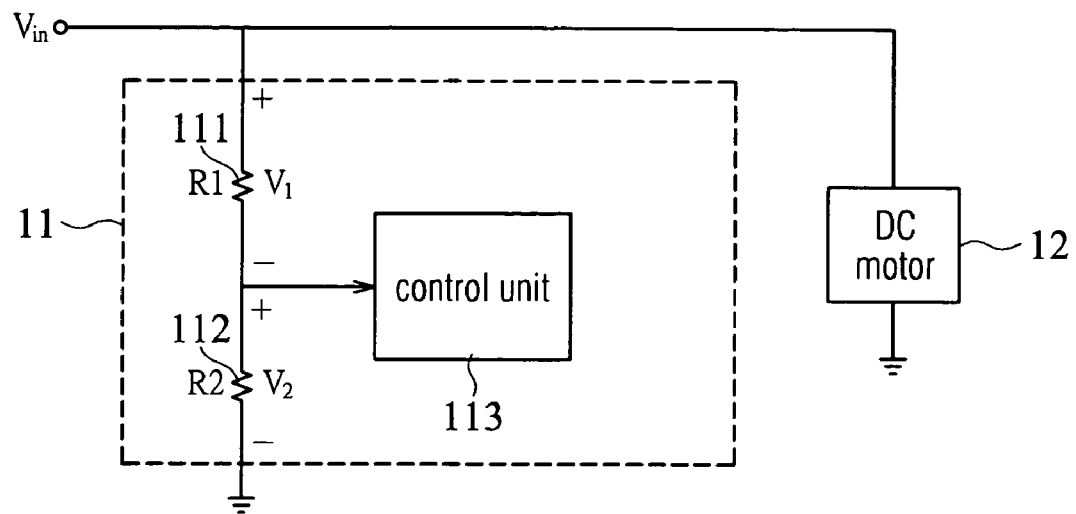
FIG. 1 shows a schematic view illustrating circuit arrangement of the overvoltage protective device for DC motor according to one embodiment of the invention.

Referring to FIG. 1, an overvoltage protective device 11 according to a first embodiment of the invention is electrically connected with a DC motor 12 in parallel, and has the same input voltage Vin as the DC motor 12. In this embodiment, a circuit of the overvoltage protective device 11 includes a voltage-dividing circuit having two resistors 111 and 112, and a control unit 113 for controlling driving status of the DC motor. With regard to circuit arrangement, the two resistors 111 and 112 are in series connection with one end of the resistor 112 connected to ground, and the control unit 113 and the resistor 112 are in parallel connection. Here, R1 and R2 are used to represent resistances of the resistors 111 and 112, respectively. In operation, the overvoltage protection device 11 acquires two voltage levels from the resistors 111 and 112, i.e., terminal voltages V1 and V2 of the two resistors 111 and 112, and the control unit 113 accesses the terminal voltage V2 of the resistor 112 to make a comparison with a predetermined reference voltage in the control unit 113. When the accessed terminal voltage V2 is lower than the reference voltage, the input voltage Vin does not exceed a rated voltage of the DC motor 12, and the control unit 113 continues driving the DC motor 12 for maintaining operations of the DC motor 12. To the contrary, when the accessed voltage V2 is larger than the reference voltage, the input voltage Vin exceeds the rated voltage of the DC motor 12, and the control unit 113 stops driving the DC motor 12 to cease operations of the DC motor 12, thereby preventing the DC motor 12 from damages caused by overvoltage operations.

For instance, when the rated voltage of the DC motor 12 is 12V, the reference voltage in the control unit 113 can be set to 5V depending on requirements, with the resistances R1 and R2 of the resistors 111 and 112 being 7Ω and 5Ω, respectively. Thus, when the terminal voltage $V_2$ accessed by the control unit 113 is larger than 5V, the input voltage $V_{in}$ of the DC motor 12 exceeds 12V and the control unit 113 then automatically stops driving the DC motor 12 using, for example, embedded programs that automatically stop driving the DC motor 12.

Figure 2:
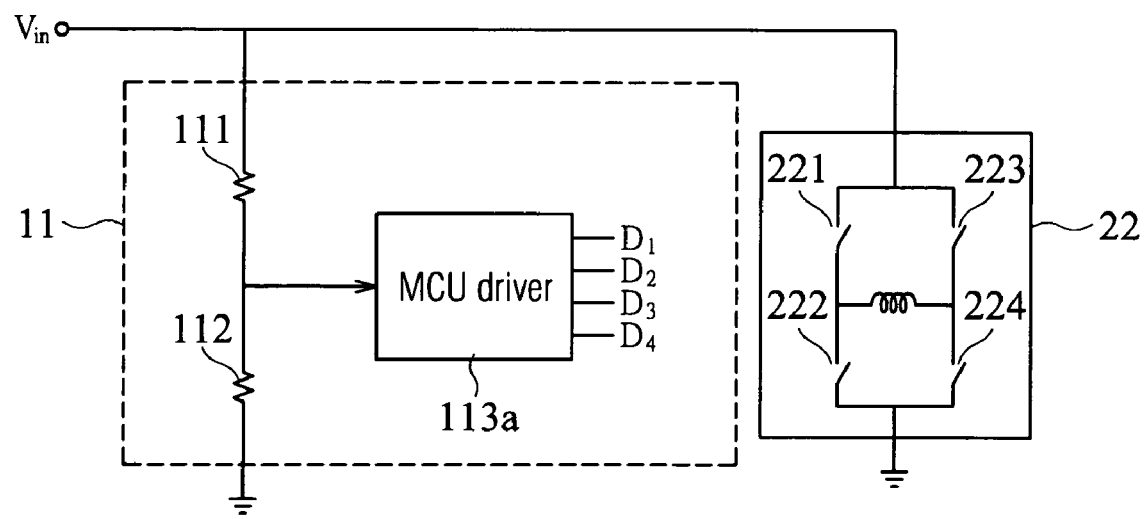
FIG. 2 shows a schematic view illustrating circuit arrangement of the overvoltage protective device for DC motor according to one application of the invention.

Referring to FIG. 2, the overvoltage protective device 11 according to the first embodiment of the invention is in parallel connection with a DC motor 22 having four power switches 221, 222, 223 and 224. In addition, a micro control unit (MCU) driver 113a is adopted as the control unit 113. In this example, four output terminals D1, D2, D3 and D4 of the MCU 113 control the four power switches 221, 222, 223 and 224 of the DC motor 22, respectively. In addition, the four power switches can be transistors.

Figure 3:
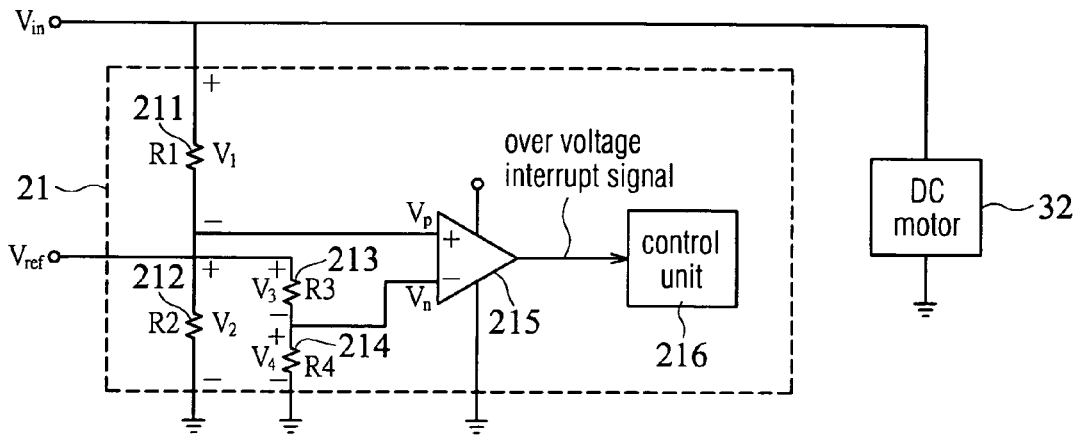
FIG. 3 shows a schematic view illustrating circuit arrangement of the overvoltage protective device for DC motor according to another embodiment the invention.

Referring to FIG. 3, an overvoltage protective device 21 according to a second embodiment of the invention is electrically connected to a DC motor 32 in parallel, and has the same input voltage $V_{in}$ as the DC motor 32. In this embodiment, the overvoltage protective device 21 includes four resistors 211, 212, 213 and 214, and a comparator 215. The comparator 215 is a type of operation amplifier. With respect to circuit arrangement, the two resistors 211 and 212 are in series connection to form a voltage-dividing circuit, and have resistances of R1 and R2, respectively, while the other two resistors 213 and 214 are in series connection to form another voltage-dividing circuit, and have resistances of R3 and R4, respectively. The comparator 215 operates in linear region to take a divided voltage $V_2$ of the resistor 212 for a non-inverted input end voltage $V_p$, and take a divided voltage $V_4$ of the resistor 214 for an inverted input end voltage $V_n$. The inverted input end voltage $V_n$ of the comparator 215 is mainly decided by a reference voltage $V_{ref}$ and resistances of the resistors 213 and 214. Therefore, we can select appropriate resistors 213 and 214 and the reference voltage $V_{ref}$ to determine the inverted input end voltage $V_n$ and to regard it as a default value. In this embodiment, the comparator 215 compares the non-inverted input end voltage $V_p$ and inverted input end voltage $V_n$. When $V_p$ is larger than $V_n$, the input voltage $V_{in}$ exceeds the rated voltage of the DC motor 32 and the comparator 215 outputs an overvoltage interrupt signal to a control unit 216, to cease the micro controller 216 from driving the DC motor 32.

For example, when the rated voltage of the DC motor 32 is 12V, we can set the reference voltage $V_{ref}$ to 12V and select resistors 211, 212, 213 and 214 having resistances of R2 and R3 of 5Ω and R1 and R4 of 7Ω. Thus, the inverted input end voltage $V_n$ is 5V. When the non-inverted input end voltage $V_p$ accessed by the comparator 215 is larger than 5V, the input voltage $V_{in}$ of the DC motor 32 exceeds 12V. Meanwhile, the comparator 215 immediately outputs an overvoltage interrupt signal to the micro controller 216 to stop the micro controller 216 from driving the DC motor 32, thereby preventing the DC motor 32 from damages caused by overvoltage operations.

Figure 4:
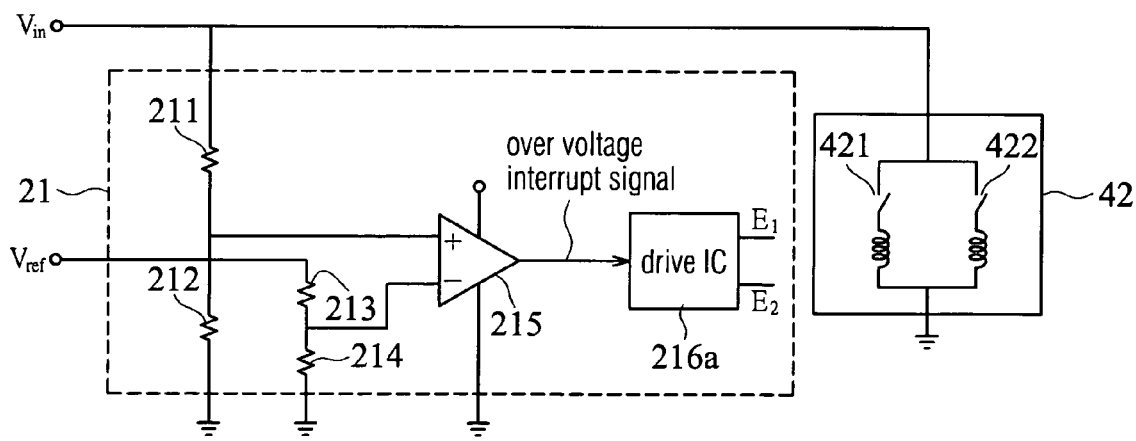
FIG. 4 shows a schematic view illustrating circuit arrangement of the overvoltage protective device for DC motor according to another application of the invention.

Referring to FIG. 4, an overvoltage protective device 21 for DC motor according to the second embodiment of the invention is in parallel connection with a DC motor 42 having two power switches 421 and 422, and adopts a drive IC (integrated circuit) 216a as the micro controller 216. In this example, two output terminals E1 and E2 of the drive IC 216a controls and drives the two power switches 412 and 422 of the DC motor 42, respectively. While over-voltage, the comparator 215 outputs an overvoltage interrupt signal to the drive IC 216a to further shut down the power switches 421 and 422, thereby ceasing operations of the DC motor 42.

It is to be noted that, the aforementioned overvoltage protective devices of DC motor can be applied not only in common axial-flow fans and centrifugal fans, but also in DC driving devices so as to prevent the driving devices from damages.

The embodiments and examples according to the invention are fully illustrated as in the above descriptions. For those who are skilled in this art, it is understood that the embodiments according to the invention are illustrative but not limitative. Without departing from the true spirit and scope of the invention, various modifications and changes of the overvoltage protective device for a direct current fan motor shall be included by the appended claims of the invention.

What is claimed is:

1. An overvoltage protective device in parallel connection with a direct-current (DC) motor, comprising:
   a voltage-dividing circuit having two opposite ends and a voltage-dividing node, wherein one end thereof is electrically connected to an input voltage of the DC motor, and the opposite end thereof is electrically connected to ground; and
   a control unit connected with the voltage-dividing node of the voltage-dividing circuit and accessing a voltage level of the part of the voltage-dividing circuit to further drive the DC motor, wherein when a voltage level of the part is larger than a predetermined reference voltage in the control unit, the control unit stops driving the DC motor to cease operations of the DC motor.

2. The overvoltage protective device as described in claim 1, wherein the reference voltage is a product of the rated voltage of the DC motor, a reciprocal of a total resistance of the voltage-dividing circuit, and a resistance of the part of the voltage-dividing circuit.

3. The overvoltage protective device as described in claim 1, wherein the voltage-dividing circuit is composed of a first resistor and a second resistor, and the part of the voltage-dividing circuit is the second resistor.

4. The overvoltage protective device as described in claim 1, wherein the control unit is a micro control unit (MCU) driver or a driver IC.

5. The overvoltage protective device as described in claim 1, wherein the DC motor is a DC fan motor.

6. An overvoltage protective device of DC motor having a plurality of power switches, comprising:
   a first resistor having two opposite ends, wherein one end thereof is electrically connected to an input end voltage of the DC motor;
   a second resistor with one end thereof electrically connected to the opposite end of the first resistor, and the other end thereof connected to ground; and
   a micro control unit (MCU) driver having a plurality of output terminals driving the power switches, and for accessing a terminal voltage of the second resistor;
   wherein, when the terminal voltage of the second resistor is larger than a predetermined reference voltage in the micro control unit driver, the micro control unit stops driving the DC motor by using programs.

7. The overvoltage protective device of DC motor as described in claim 6, wherein the reference voltage is a product of the input voltage of the DC motor, a reciprocal of a sum of the resistances of the first resistor and the second resistor, and a resistance of the second resistor.

8. An overvoltage protective device of DC motor comprising:
   a first voltage-dividing circuit having two opposite ends and a voltage-dividing node, wherein one end thereof is electrically connected to an input end voltage of a DC motor, and the opposite end thereof is electrically connected to ground;
   a second voltage-dividing circuit having one end thereof electrically connected to a reference voltage end, and the other end connected to ground;
   a control unit for controlling start of the DC motor; and
   an operation amplifier having a non-inverted input end electrically connected to the voltage-dividing node, an inverted input end thereof electrically connected to the second voltage-dividing circuit, and an output end thereof electrically connected to the control unit;
   wherein when a voltage at the non-inverted input end of the operation amplifier is larger than a voltage at the inverted input end, the operation amplifier outputs an overvoltage interrupt signal to the control unit to cease the control unit from driving the DC motor.

9. The overvoltage protective device of DC motor as described in claim 8, wherein the first voltage-dividing circuit comprises a first resistor and a second resistor, the second voltage-dividing circuit comprises a third resistor and a fourth resistor, the non-inverted input end of the operation amplifier is electrically connected between the first resistor and the second resistor, and an inverted input end of the operation amplifier is electrically connected between the third resistor and the fourth resistor.

10. The overvoltage protective device of DC motor as described in claim 8, wherein the operation amplifier is a comparator.

11. The overvoltage protective device of DC motor as described in claim 8, wherein the control unit is a drive IC or a MCU.

12. The overvoltage protective device of DC motor as described in claim 8, wherein the DC motor is a DC fan motor.

13. An overvoltage protective device of DC motor having a plurality of power switches, comprising:
   a first resistor having two opposite end, wherein one end thereof is electrically connected to a voltage input end of the DC motor;
   a second resistor with one end thereof connected to the opposite end of the first resistor, and other end thereof connected to ground;
   a third resistor with one end thereof connected to a reference voltage end;
   a fourth resistor with one end thereof electrically connected to the other end of the third resistor, and the other end thereof grounded;
   a drive IC having a plurality of output terminals for respectively driving the power switches; and
   a comparator having a non-inverted input end thereof connected between the first resistor and the second resistor, an inverted input end thereof electrically between the third resistor and the fourth resistor, and an output end thereof electrically connected to the drive IC;
   wherein when a voltage at the non-inverted input end is larger than a voltage at the inverted input end, the comparator outputs an overvoltage interrupt signal to the drive IC to stop driving the DC motor.

14. The overvoltage protective device of DC motor as described in claim 13, wherein the reference voltage is a rated voltage of the DC motor.

15. The overvoltage protective device as described in claim 1, wherein the control unit further comprises four output terminals and the DC motor further comprises four power switches, each of the output terminals respectively controlling a corresponding one of the four power switches.

16. The overvoltage protective device as described in claim 1, wherein the control unit further comprises two output terminals and the DC motor further comprises two power switches, each of the output terminals respectively controlling a corresponding one of the two power switches.

17. The overvoltage protective device as described in claim 1, further comprising a second voltage-dividing circuit and an operation amplifier, wherein the second voltage-dividing circuit includes two resistors.

\* \* \* \* \*